United States Patent
Lee et al.

(10) Patent No.: US 10,977,012 B2
(45) Date of Patent: Apr. 13, 2021

(54) COMPUTING DEVICE FOR ACCELERATING A DATA TYPE CHECK AND OPERATING METHOD THEREOF

(71) Applicant: SEOUL NATIONAL UNIVERSITY R&DB FOUNDATION, Seoul (KR)

(72) Inventors: Jae Wook Lee, Seoul (KR); Channoh Kim, Suwon-si (KR); Jaehyeok Kim, Seoul (KR); Sungmin Kim, Busan (KR)

(73) Assignee: Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 16/270,054

(22) Filed: Feb. 7, 2019

(65) Prior Publication Data
US 2019/0310833 A1   Oct. 10, 2019

(30) Foreign Application Priority Data

Apr. 6, 2018 (KR) ........................ 10-2018-0040311

(51) Int. Cl.
*G06F 8/30* (2018.01)
*G06F 7/483* (2006.01)

(52) U.S. Cl.
CPC ................ *G06F 8/37* (2013.01); *G06F 7/483* (2013.01)

(58) Field of Classification Search
CPC .............. G06F 8/37; G06F 8/41; G06F 7/483
See application file for complete search history.

(56) References Cited

U.S. PATENT DOCUMENTS

| | | | | |
|---|---|---|---|---|
| 5,293,629 A | * | 3/1994 | Conley | ...................... G06F 8/75 717/114 |
| 5,519,841 A | * | 5/1996 | Sager | ........................ G06F 9/32 711/202 |
| 5,737,629 A | | 4/1998 | Zuraski, Jr. et al. | |
| 6,108,772 A | * | 8/2000 | Sharangpani | ........... G06F 7/483 708/500 |
| 7,240,074 B2 | | 7/2007 | Lee | |
| 7,250,074 B2 | | 7/2007 | Tonkovich et al. | |
| 9,189,215 B1 | * | 11/2015 | Riche | ...................... G06F 8/433 |
| 9,336,125 B2 | | 5/2016 | Eggers et al. | |

(Continued)

FOREIGN PATENT DOCUMENTS

| | | |
|---|---|---|
| KR | 2004-0074766 A | 8/2004 |
| KR | 2007-0021879 A | 2/2007 |

OTHER PUBLICATIONS

Notice of Allowance for Korean Application No. 10-2018-0040311 dated Aug. 8, 2019.

(Continued)

*Primary Examiner* — Phillip H Nguyen
(74) *Attorney, Agent, or Firm* — Harness, Dickey & Pierce, P.L.C.

(57) ABSTRACT

Provided is a computing device according to an embodiment of the present disclosure including an integrated register file configured to store a first variable type and a first variable value of a first variable, and a second variable type and a second variable value of a second variable, a calculator configured to perform a first calculation on the first and second variables according to the first and second variable types, and output a first calculation result, and a type rule table comprising a plurality of entries and, when there is an entry corresponding to a type of the first calculation, and the first and second variable types, configured to output a type of the first calculation result.

12 Claims, 14 Drawing Sheets

(56) References Cited

U.S. PATENT DOCUMENTS

| | | | | |
|---|---|---|---|---|
| 9,430,358 | B1* | 8/2016 | Thayer | G06F 11/3688 |
| 2006/0130024 | A1* | 6/2006 | Fortier | G06F 8/52 |
| | | | | 717/140 |
| 2007/0294507 | A1* | 12/2007 | Veidenbaum | G06F 9/3826 |
| | | | | 712/10 |
| 2016/0378639 | A1* | 12/2016 | Thayer | G06F 11/3688 |
| | | | | 717/129 |
| 2017/0028994 | A1* | 2/2017 | Addison | G05B 19/042 |

OTHER PUBLICATIONS

Anderson, Owen et al., "Checked Load: Architectural Support for JavaScript Type-Checking on Mobile Processors" Institute of Electrical and Electronics Engineers, pp. 1-12, 2011.

Lee, Jae W., "Typed Architectures, Architectural Support for Lightweight Scripting", Department of Computer Science and Engineering, Seoul University dated Dec. 12, 2017.

Kim, Channoh, "Typed Architectures, Architectural Support for Lightweight Scripting", Department of Electrical and Computer Engineering, Sungkyunkwan University dated Mar. 9, 2018.

Kim, Channoh; Kim, Jaehyeok et al., "Typed Architectures, Architectural Support for Lightweight Scripting", Sungkyunkwan University and Seoul University, Architecture and Code Optimization (ARC) Laboratory @ SNU, Korea Computer Congress 2017, Jun. 8, 2017.

Kim, Channoh; Kim, Jaehyeok et al., "Typed Architectures, Architectural Support for Lightweight Scripting", Sungkyunkwan University and Seoul University, ASPLOS '17, Apr. 8, 2012, 2017 Xi'an, China pp. 77-90.

* cited by examiner

FIG. 14

```
1   case : ADD
2     Value *rb = RB(bc); Value *rc = RC(bc);
3     uint64_t tmp1, tmp2;
4     asm volatile(
5       "tld    %0,0(%2)\n\t"        // load rb  (v,t)
6       "tld    %1,0(%3)\n\t"        // load rc  (v,t)
7       "thdl   ADD_slow\n\t"        // set err handler
8       "xadd   %0,%1,%0\n\t"        // ra = rb + rc
9       "tsd    %0,0(%4)\n\t"        // store ra (v,t)
10      "j      .loop_header\n\t"    // go to loop header
11      : "=&r" (tmp1), "=&r"(tmp2)
12      : "r"(rb), "r"(rc), "r"(ra)
13      : "memory"
14    );
15    ADD_slow:
16      Number nb, nc;
17      // convert rb and rc to float
18      // if successful, calculate sum and set type
19      if(toNumber(rb,&nb) && toNumber(rc,&nc)){
20        type(ra) = FLOAT;
21        fval(ra) = nb + nc;
22      }else{
23        /* handle exception cases*/
24      }
25      break;
```

COMPUTING DEVICE FOR ACCELERATING A DATA TYPE CHECK AND OPERATING METHOD THEREOF

CROSS-REFERENCE TO RELATED APPLICATIONS

This U.S. non-provisional patent application claims priority under 35 U.S.C. § 119 from Korean Patent Application No. 10-2018-0040311, filed on Apr. 6, 2018, the entire contents of which are hereby incorporated by reference.

BACKGROUND

The present disclosure herein relates to a hardware device, and more particularly, to a computing device for accelerating a data type check and an operating method thereof.

A dynamic scripting language such as JavaScript, Lua, or Python is used in various fields. Due to convenience of use, such a scripting language is also used not only in a desktop or a server, but also in a single board-embedded computer like Raspberry Pi or Arduino.

The dynamic scripting language may support a dynamic type system, which determines a type of a variable at the time of execution, and thus may provide programming convenience. Since the type of the variable varies according to an input given at the execution time, the dynamic type system necessarily executes a type check in which the type of the variable is extracted and compared, before most of calculations of the script is performed. Accordingly, the dynamic type system may cause inefficiency in an aspect of the number of instructions, a memory usage, an amount of energy consumption, or the like.

SUMMARY

It is an aspect to provide a computing device capable of reducing an overhead, which occurs in a type check of a variable, and an operating method thereof.

An aspect of an exemplary embodiment provides a computing device including: an integrated register file configured to store a first variable type and a first variable value of a first variable, and a second variable type and a second variable value of a second variable; a calculator configured to perform a first calculation on the first and second variables according to the first and second variable types, and output a first calculation result; and a type rule table comprising a plurality of entries and, when there is an entry corresponding to a type of the first calculation, and the first and second variable types, configured to output a type of the first calculation result.

In an exemplary embodiment, the integrated register file may further store a first type flag configured to indicate whether the first variable type is an integer type or a floating point type, and a second type flag configured to indicate whether the second variable type is an integer type or a floating point type.

In an exemplary embodiment, the calculator may include: a first calculation module configured to perform the first calculation, when the first type flag and the second type flag indicate integer types; and a second calculation module configured to perform the first calculation, when the first type flag and the second type flag indicate floating point types.

In an exemplary embodiment, the type rule table may further output a type flag of the first calculation result for indicating whether the type of the first calculation result is an integer type or a floating point type.

In an exemplary embodiment, the first calculation result and the type of the first calculation result may be stored in the integrated register file.

In an exemplary embodiment, the computing device may further comprise a type extractor configured to extract the first and second variable types and the first and second variable values from a memory to store in the integrated register file.

In an exemplary embodiment, the type extractor may include: an offset register configured to store, on a basis of a first data word comprising a value of a variable, a position of a second data word comprising a type of the variable; a shift register configured to store a start position of bits configured to indicate the type of the variable in the second data word comprising the type of the variable; and a mask register configured to store bits of which values are 1 as many as a number of the bits configured to indicate the type of the variable.

In an exemplary embodiment, the computing device may further include a type inserter configured to extract the first calculation result and the type of the first calculation result from the integrated register file to store in the memory.

In an exemplary embodiment, the computing device may further include: a handler register configured to store a start address of a routine for performing a type check of a variable without using the type rule table, wherein when there is not the corresponding entry in the type rule table, the first and second variable types are checked according to execution of the routine.

In an aspect of an exemplary embodiment, an operating method of a computing device, which includes: an integrated register file configured to store types and values of variables; and a type rule table including a plurality of entries, the operation method including: receiving an instruction for a first calculation on a first variable and a second variable; checking a first variable type of the first variable and a second variable type of the second variable from the integrated register file; and when there is an entry corresponding to a type of the first calculation, and the first and second variable types in the type rule table, acquiring a result type of a first calculation from the type rule table.

In an exemplary embodiment, the operating method may further include storing the result type of the first calculation in the integrated register file.

In an exemplary embodiment, the operating method may further include performing the first calculation on the first and second variables according to the first and second variable types stored in the integrated register file.

In an exemplary embodiment, when the first and second variable types are all integer types or floating point types, the first calculation may be performed.

In an exemplary embodiment, the operating method may further include storing a first calculation result generated from the first calculation in the integrated register file.

In an exemplary embodiment, the operating method may further include: moving to a start address of a type check routine for performing a type check of a variable, when there is not the corresponding entry in the type rule table; checking the first and second variable types without using the type rule table in response to the type check routine; and converting, on a basis of the checked types, one of the types of the first and second variables so that the one matches another type.

In an aspect of exemplary embodiment, a computing device includes: an instruction decoder configured to receive an instruction and determine an operation code of the instruction and a variable related to the instruction; an integrated register file configured to output a variable type corresponding to the variable; and a type rule table comprising a plurality of entries and configured to output a type of result data corresponding to the operation code and the variable type, when there is an entry corresponding to the operation code and the variable type.

In an exemplary embodiment, the computing device may further include: a handler register configured to store a start address of a routine for performing a type check of the variable without using the type rule table, wherein when there is not the corresponding entry, the type rule table outputs, to the handler register, a signal 'miss' for indicating that there is not the corresponding entry, and the routine is executed in response to the signal 'miss' and thus the type check of the variable is performed.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 14 is an example of a bytecode interpreter according to an exemplary embodiment.

DETAILED DESCRIPTION

Figure 1:
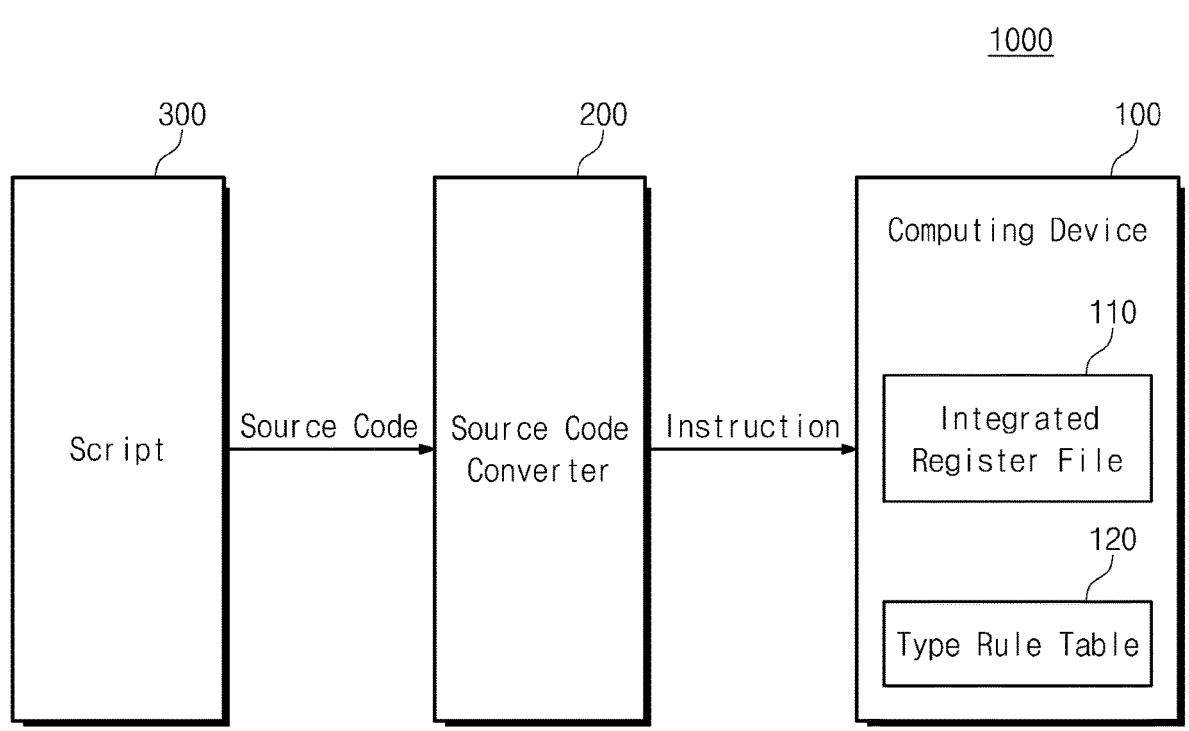
FIG. 1 is a block diagram showing an electronic device according to an exemplary embodiment.

Hereinafter exemplary embodiments will be described in detail with reference to the accompanying drawings. In the following description, specific details such as detailed components and structures are provided to assist overall understanding of exemplary embodiments. Therefore, various changes or modifications can be made by those of ordinary skill in the art in the specific details without departing from technical spirit and scope of the present disclosure. In addition, descriptions of well-known functions and constructions may be omitted for clarity and conciseness. Terms used herein are defined in consideration of functions of the present disclosure, and are not limited specific functions. The definitions of the terms can be determined based on details described in the specification.

Modules in the following drawing or description can be connected things other than elements shown in the drawing or described in the specification. Modules or elements can be respectively connected directly or indirectly to each other. Modules or elements can be respectively connected by communication or physical connection.

Elements described with reference to terms such as part, unit, module, or layer used in the description and functional blocks illustrated in the drawings can be implemented in a form of software, hardware, or a combination thereof. For example, the software can be machine code, firmware, embedded code, and application software. Also for example, the hardware can be electrical circuitry, electronic circuitry, processor, computer, integrated circuit, integrated circuit cores, a pressure sensor, an inertial sensor, a microelectromechanical system (MEMS), passive devices, or a combination thereof.

Unless defined otherwise, all the terms including technical or scientific terms used herein have the same meaning as those understood generally by a person having an ordinary skill in the art. The terms having the same meaning as those defined in generally used dictionaries shall be construed to have the meaning conforming to the contextual meaning of the related technologies, and shall not be construed as ideal or excessively formal meaning unless the terms are apparently defined in this application.

FIG. 1 is a block diagram showing an electronic device according to an exemplary embodiment. The electronic device 1000 may include a computing device 100, a source code converter 200, and a script 300. For example, the electronic device 1000 may include an embedded computer, a desktop, and a server, but the inventive concept is not limited thereto. The electronic device 1000 may include various kinds of electronic devices including a CPU and an acceleration processor.

The computing device 100 may receive an instruction and operate on the basis of the received instruction. The instruction may be generated based on a source code of the script 300. The computing device 100 may perform various operations according to the source code. For example, when the source code represents a calculation of two variables, the computing device 100 may perform the calculation of the two variables.

The source code converter 200 may convert the source code of the script 300 to a type recognizable by the computing device 100. The source code converter 200 may convert the source code so as to generate an instruction recognizable by the computing device 100. For example, the instruction may be a machine language. The source code converter 200 may convert the source code to a bytecode and generate a machine language from the converted bytecode. In other words, the source code converter 200 may include at least one of an interpreter and a compiler.

The source code converter 200 may receive one source code from the script 300 and generate a plurality of instructions corresponding to the source code. The computing device 100 may receive the plurality of instructions from the source code converter 200 in order to execute an instruction represented by one source code. The computing device 100 may process the one source code by processing the plurality of instructions.

The script 300 may include a source code. The source code included in the script 300 may be converted to an instruction by the source code converter 200. As the source code included in the script 300 is executed, the electronic device 1000 may perform various operations.

The script 300 may be a program stored in an internal memory (not shown) of the electronic device 1000. For example, the script 300 may be a program constructed in a dynamic scripting language. For the program constructed in the dynamic scripting language, a type of a variable included in the script 300 may not be defined, and the type of the variable may be changed according to an execution time. Accordingly, the computing device 100 may check the type of the variable in order to process an instruction. For example, the computing device 100 may check types of variables corresponding to operands in order to process an operation instruction for the variables.

The computing device 100 may include an integrated register file 110 and a type rule table 120. The computing device 100 may check the type of the variable through the integrated register file 110. The integrated register file 110 may store type information on the variable in advance. For example, when receiving an instruction for a specific variable, the computing device 100 may check a type of the specific variable through the integration register file 110. The type of the variable may be simply checked through the type information on the variable, which is stored in the integrated register file 110, and thus the computing device 100 may rapidly process the instruction.

The computing device 100 may store result data generated by processing the instruction in the integrated register file 110. The result data may be data generated by processing a variable according to an operation code. The computing device 100 may store type information as well as the generated result data in the integrated register file 110. The computing device 100 may acquire the type of the result data through the type rule table 120.

The type rule table 120 may store type information on result data corresponding to various situations. For example, the type rule table 120 may store corresponding type information on result data according to an operation code 'opcode' of an instruction and a type of a variable. The type of the result data may vary according to a type of an instruction (i.e. the operation code of the instruction) and the type of the variable. Accordingly, the computing device 100 may acquire the type information on the result data according to the operation code and the type of the variable through the type rule table 120

The computing device 100 may store the acquired type information on the result data in the integrated register file 110. Then, when receiving an instruction about the result data, the computing device 100 may perform a type check on the result data through the integrated register file 110.

Figure 2:
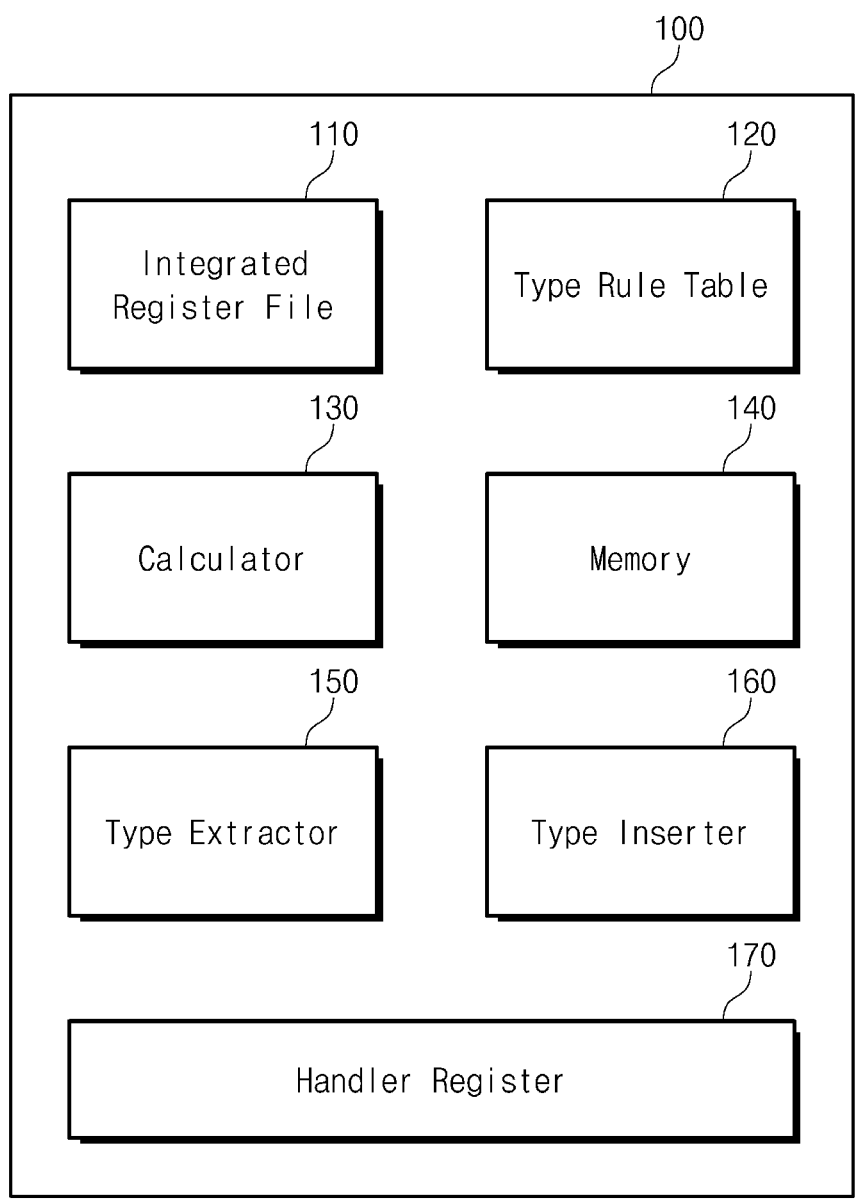
FIG. 2 is a block diagram showing an example of a computing device of FIG. 1.

FIG. 2 is a block diagram showing an example of the computing device of FIG. 1. In relation to FIG. 2, the computing device 100 may include the integrated register file 110, the type rule table 120, a calculator 130, a memory 140, a type extractor 140, a type inserter 160, and a handler register 170.

The integrated register file 110 may store type information on and a value of a variable. The type information may include not only a type, but also a flag bit indicating whether the type of the variable is a specific type. For example, the flag bit may indicate whether the variable is an integer type or a floating point type. A type check for the variable may be performed using the type information stored in the integrated register file 110.

The integrated register file 110 may output the type and value of the variable according to a request. The type of the variable output from the integrated register file 110 may be provided to the type rule table 120, and the value of the variable may be provided to the calculator 130.

The type rule table 120 may include a plurality of entries. Each of the entries may include type information on result data. The type information on the result data may be different according to an operation code and the type of the variable. The type rule table 120 may include not only the type of the result data, but also a flag bit indicating whether the type of the result data is a specific type.

The type rule table 120 may receive the operation code and the type of the variable, and determine whether an entry corresponding thereto exists. When the corresponding entry exists, the type rule table 120 may output corresponding type information on the result data. For example, the type rule table may be a content addressable memory. The output type information may be stored in the integrated register file 110. The entries of the type rule table 120 may be set in an operation of initializing the computing device 100 or in execution of the script.

The calculator 130 may perform a calculation on the basis of types of variables. When the types of the variables are combinations of types capable of being processed by the calculator 130, the calculator 130 may perform the calculation. For example, when all the types of the variables are integer types or floating point types, the calculator 130 may perform the calculation. The types of the variables may be checked through the integrated register file 110. The calculator 130 may perform calculation using values of the variables output from the integrate register file 110.

The calculator 130 may perform calculation of variables and output operation result (i.e. result data). The calculation result output from the calculator 130 may not include type information. In other words, the calculation result may include only information on a value thereof. The calculation result may be stored in the integrated register file 110.

The memory 140 may store various kinds of information on the variables. The information on the variables may include information on a variable value and a variable type. Values of and type information on the variables extracted from the memory 140 may be provided to the integrated register file 110. For example, the integrated register file 110 may receive values and type information related to a received instruction from the memory 140.

The type extractor 150 may extract the types and values of the variables stored in the memory 140. The type extractor 150 may extract the types and values of the variables to store in the integrated register file 110. The type extractor 150 may extract the types and values of the variables related to the received instruction. For example, when a calculation instruction is received, the type extractor 150 may extract types and values of variables corresponding to operands.

The type inserter 160 may extract the types and values of the variables stored in the integrated register file 110, and store the same in the memory 140. For example, when a calculation result and a type of the calculation result are stored in the integrated register file 110, the type inserter 160 may extract the calculation result and the type of the calculation result from the integrated register file 110 to store the same in the memory 140.

The handler register 170 may store a start address of a type check routine for executing a type check of a variable.

When the type check of the variable is performed through the type check routine, the computing device 100 may not use the type rule table 120. In this case, the type check of the variable may be performed in a typical type check scheme performed in software. For example, when the type of the variable is not stored in the integrated register file 110, the computing device 100 may move to the start address stored in the handler register 170 to check the type of the variable. Alternatively, when the corresponding entry in the type rule table 120 does not exist, the computing device 100 may move to the start address stored in the handler register 170 to check the type of the variable.

As shown in FIG. 2, the computing device 100 may simply check the type of the variable through the integrated register file 110. In particular, when the calculation is performed, types of dynamically varying variables are stored in the integrated register file 110, and thus the computing device 100 may rapidly perform the type check of the variables through the integrated register file 110, and perform calculation on the basis of a performed type check result. In addition, the computing device 100 may simply acquire a type of a calculation result through the type rule table 120. The acquired type of the calculation result is stored in the integrated register file 110, and thereafter, the computing device 100 may simply check the type of the calculation result.

Figure 3:
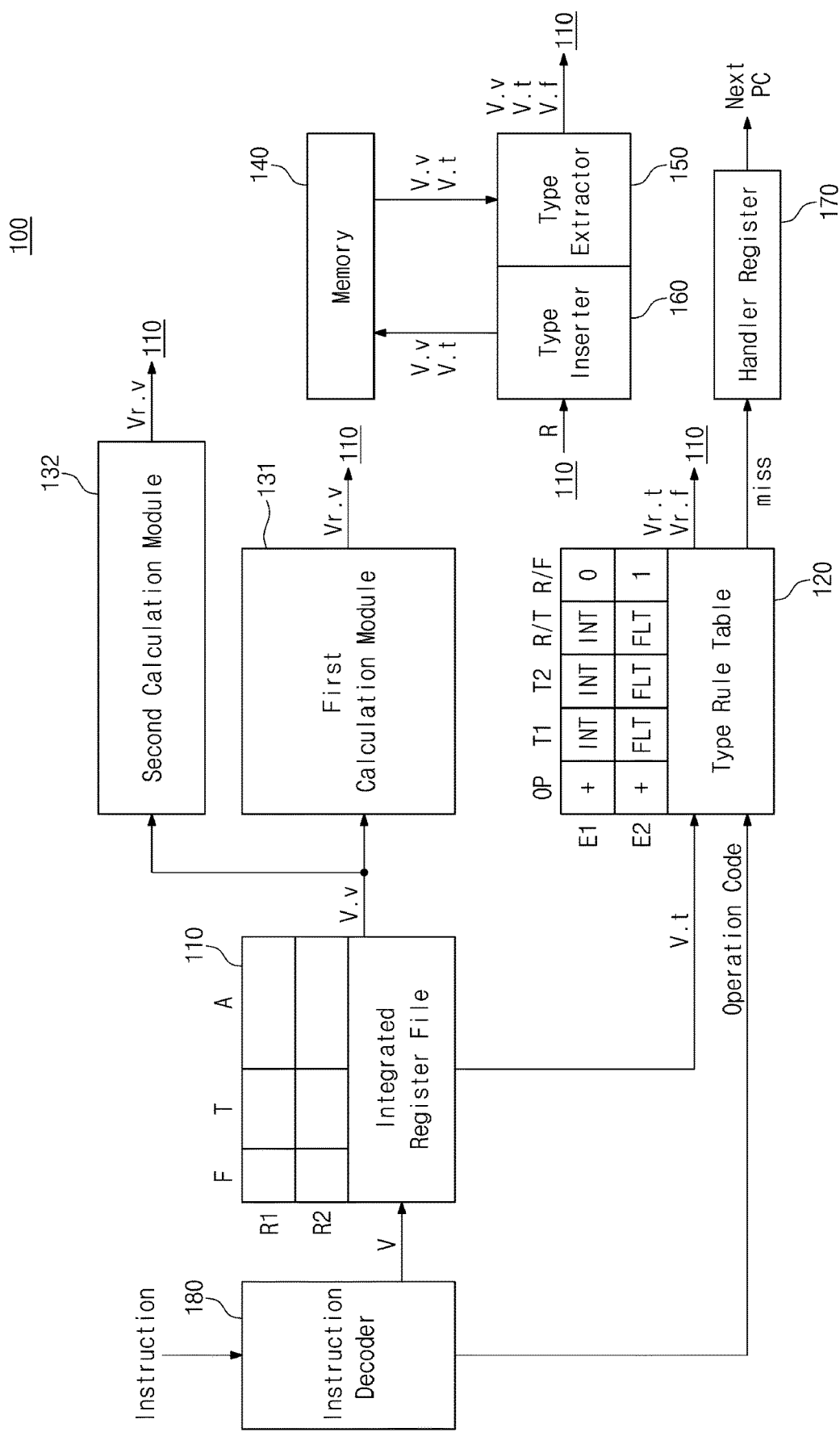
FIG. 3 is a block diagram showing the computing device of FIG. 2 in detail.

FIG. 3 is a block diagram showing the computing device of FIG. 2 in detail. In relation to FIG. 3, the computing device 100 may include the integrated register file 110, the type rule table 120, a first calculation module 131, a second calculation module 132, the memory 140, the type extractor 150, the type inserter 160, the handler register 170, and an instruction decoder 180. The first calculation module 131 and the second calculation module 132 may be included in the calculator 130 of FIG. 2. The computing device 100 may further include the instruction decoder 180 in comparison to the computing device 100 of FIG. 2.

The instruction decoder 180 may receive an instruction and decode the received instruction. According to a decoding result, the computing device 100 may perform a corresponding operation in response to the received instruction. The instruction decoder 180 may decode the instruction and extract an operation code and a variable V of the instruction. The extracted variable V may be provided to the integrated register file 110, and the extracted operation code may be provided to the type rule table 120.

The integrated register file 110 may include a plurality of registers (e.g., registers R1 and R2). Each register may include a flag field F, a type field T, and a value field A. The flag bit indicating whether the variable is an integer type or a floating point type may be stored in the flag field F. The type of the variable may be stored in the type field T, and the value of the variable may be stored in the value field A. The integrated register file 110 may output a type V.t of the variable stored in a register corresponding to the variable V and the value V.v of the variable. The integrated register file 110 may provide the value V.v of the variable to the first calculation module 131 or the second calculation module 132, and the type (V.t) of the variable to the type rule table 120.

The type rule table 120 may include a plurality of entries. Each entry may include an operation code field OP, a first type field T1, a second type field T2, a result type field R/T, and a result flag field R/F. As shown in FIG. 3, "+", "INT", "INT, "INT", and '0' may be respectively stored in the operation code field OP, the first type field T1, the second type field T2, the result type field R/T, and the result flag field R/F of a first entry E1. "+" stored in the operation code field OP may represent an operation code for an addition, and "INT" stored in the first type field T1, the second type field T2, and the result type field R/T may represent an integer type. '0' stored in the result flag field R/F may be a flag bit representing that a type of a calculation result is an integer type. In other words, the type rule table 120 may store in advance type information on the calculation result generated from an addition result of integer variables.

Similarly, "+", "FLT, "FLT, "FLT", and '1' may be respectively stored in the operation code field OP, the first type field T1, the second type field T2, the result type field R/T, and the result flag field R/F of a second entry E2. "+" stored in the operation code field OP may represent an operation code for an addition, and "FLT" stored in the first type field T1, the second type field T2, and the result type field R/T may represent a floating point type. '1' stored in the result flag field R/F may be a flag bit representing that a type of a calculation result is a floating point type. In other words, the type rule table 120 may store in advance type information on the calculation result generated from an addition result of floating point variables.

The type rule table 120 may determine whether there is an entry corresponding to a received operation code and variable type V.t. When the corresponding entry exists, the type information stored in the corresponding result type field R/T and result flag field R/F may be output. The type Vr.t of the result data and the flag bit Vr.f of the result data may be stored in the integrated register file 110. When there is not the corresponding entry, the type rule table 120 may provide, to the handler register 170, a signal 'miss' for indicating non-existence of the corresponding entry. In this case, the start address of the type check routine stored in the handler register 170 may be output. The computing device 100 may move to the start address of the type check routine to check the type of the variable V without using the type rule table 120.

The first calculation module 131 may perform an integer type calculation on the basis of a value V.v of a variable provided from the integrated register file 110. For example, the first calculation module 131 may be an integer ALU (integer Arithmetic-Logical Unit). The first calculation module 131 performs a calculation to generate a calculation result Vr.v. The generated calculation result Vr.v may be stored in the integrated register file 110. The second calculation module 132 may perform a floating point type calculation on the basis of the value V.v of the variable provided from the integrated register file 110. For example, the second calculation module 132 may be a FPU (Floating-Point Unit). The second operation module 132 may perform a calculation to generate the calculation result Vr.v. The generated calculation result Vr.v may be stored in the integrated register file 110.

The type extractor 150 may extract the variable value V.v and the variable type V.t from the memory 140. The type extractor 150 may generate a flag bit V.f of the variable from the variable type V.t. For example, when the variable type V.t is an integer type or floating point type, the type extractor 150 may generate the flag bit V.f of the variable. The generated variable value V.v, the variable type V.t and the variable flag bit V.f may be stored in the integrated register file 110.

The type inserter 160 may extract the variable value V.v and the variable type V.t from the integrated register file 110. The extracted variable value V.v and variable type V.t may be stored in the memory 140.

Figure 4:
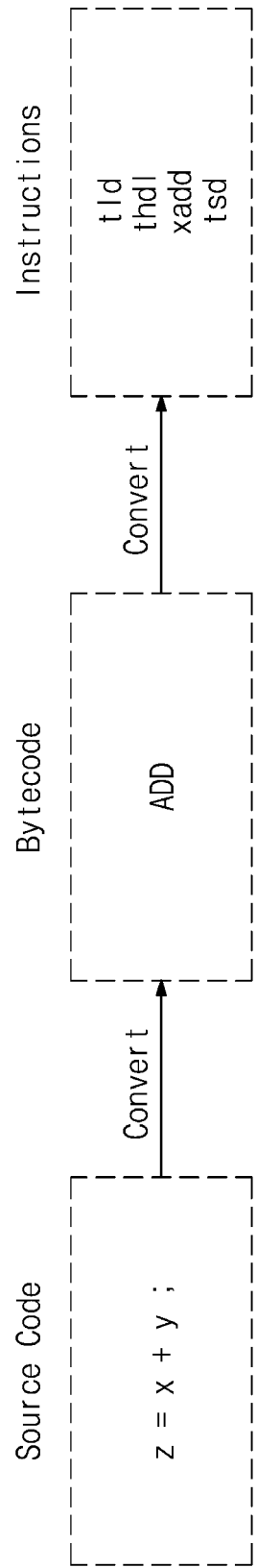
FIG. 4 is a drawing showing examples of a source code and an instruction of FIG. 1.

FIG. 4 is a drawing showing examples of a source code, a bytecode, and an instruction of FIG. 1. In relation to FIGS. 1 and 4, a source code "z=x+y;" may be one of source codes included in the script 300. The source code converter 200 may convert the source code to an "ADD" bytecode showing addition of two variables (namely, "x" and "y"). In order to execute the "ADD" bytecode, the source code converter 200 may generate a plurality of instructions. As shown in FIG. 4, the source code converter 200 may generate the plurality of instructions such as "tld", "thdl", "xadd", and "tsd". The computing device 100 may process the generated plurality of instructions to execute "z=x+y".

"tld" is an instruction for extracting the type and value of the variable from the memory 140 to store in the integrated register file 110. The computing device 100 may store the type and value of the variable in the integrated register file 110 through the type extractor 150 in response to "tld". In response to "tld" generated for executing "ADD", the computing device 100 may store types and values of two variables in the integrated register file 110.

"thdl" is an instruction for storing the start address of the type check routine in the handler register 170. In response to "thdl", the computing device 100 may store the start address of the type check routine in the handler register 170. When a corresponding entry in the type rule table 120 does not exist, the computing device 100 may move to an address stored in the handler register 170 to check types of two variables. The type check performed in this case may be performed in a typical type check scheme performed in software.

"xadd" is an instruction for performing an addition calculation and a type check for a calculation result. In response to "xadd", the computing device 100 may check types of two variables through the integrated register file 110. The calculator 130 may perform the addition calculation on the basis of the types of the two variables. For example, when the types of the two variables are all integer types or floating point types, the calculator 130 may perform an addition calculation. The calculation result generated from the calculator 130 may be stored in the integrated register file 110.

In addition, the computing device 100 may check the type rule table 120 in response to "xadd". When there is an entry corresponding to an operation code and the types of the two variables for an addition, the type rule table 120 may output a type of a corresponding calculation result. The type rule table 120 may output not only the type of the corresponding calculation result, but also a flag bit of the calculation result. The type and flag bit of the calculation result, which are output from the type rule table 120, may be stored in the integrated register file 110. When there is not the entry corresponding to the operation code and the types of the two variables for addition, the computing device 100 may move to an address stored in the handler register 170 to check the types of the two variables.

"tsd" is an instruction for extracting a type and a value of a variable from the integrated register file 110 and store the same in the memory 140. In response to "tsd", the computing device 100 may store the type and value of the variable through the type extractor 160 in the memory 140. For example, when, in response to "xadd", the calculation result and the type of the calculation result are stored in the integrated register file 110, the type inserter 160 may extract the calculation result and the type of the calculation result stored in the integrated file 110. The type inserter 160 may store the extracted calculation result and the type of the calculation result in the memory 140.

As shown in FIG. 4, in order to execute one source code, the computing device 100 may sequentially process a plurality of instructions. The instructions in FIG. 4 are new instructions based on the integrated register file 110 and the type rule table 120, and thus, may be different from those typically generated to execute "ADD". Through "xadd" generated to execute "ADD", whether to perform an integer type addition or a floating point type addition may be dynamically determined according to pre-stored types of variables stored in advance. In other words, the integer type calculation or the floating point type calculation may be performed through one calculation instruction. In addition, a type check for the calculation result may be performed in response to "xadd". In this way, the inventive concept may reduce the number of generated instructions, since a calculation of the variables having variable types and a type check for the calculation result may be performed on the basis of one instruction.

The source code and instructions in FIG. 4 are just examples and are not intended to limit the inventive concept. For example, when the source code is "SUB" for instructing a subtraction of two variables, one of instructions generated from the source code converter 200 may be "xsub". "xsub" may be an instruction for performing a subtraction calculation and a type check for a calculation result. For example, when the source code is "MUL" for instructing a multiplication of two variables, one of instructions generated from the source code converter 200 may be "xmul". "xmul" may be an instruction for performing a multiplication calculation and a type check for a calculation result. In other words, generated instructions may be different according to source codes, and the generated instructions may be instructions based on the computing device 100.

Hereinafter, a detailed description will be provided about operations of the computing device 100 according to exemplary embodiments in relation to FIGS. 5 to 11. For convenience of description, as shown in FIG. 4, it is assumed that the computing device 100 processes a plurality of instructions for processing the bytecode "ADD". However, the inventive concept is not limited thereto, and the computing device 100 may perform various calculations and process various instructions.

Figure 5:
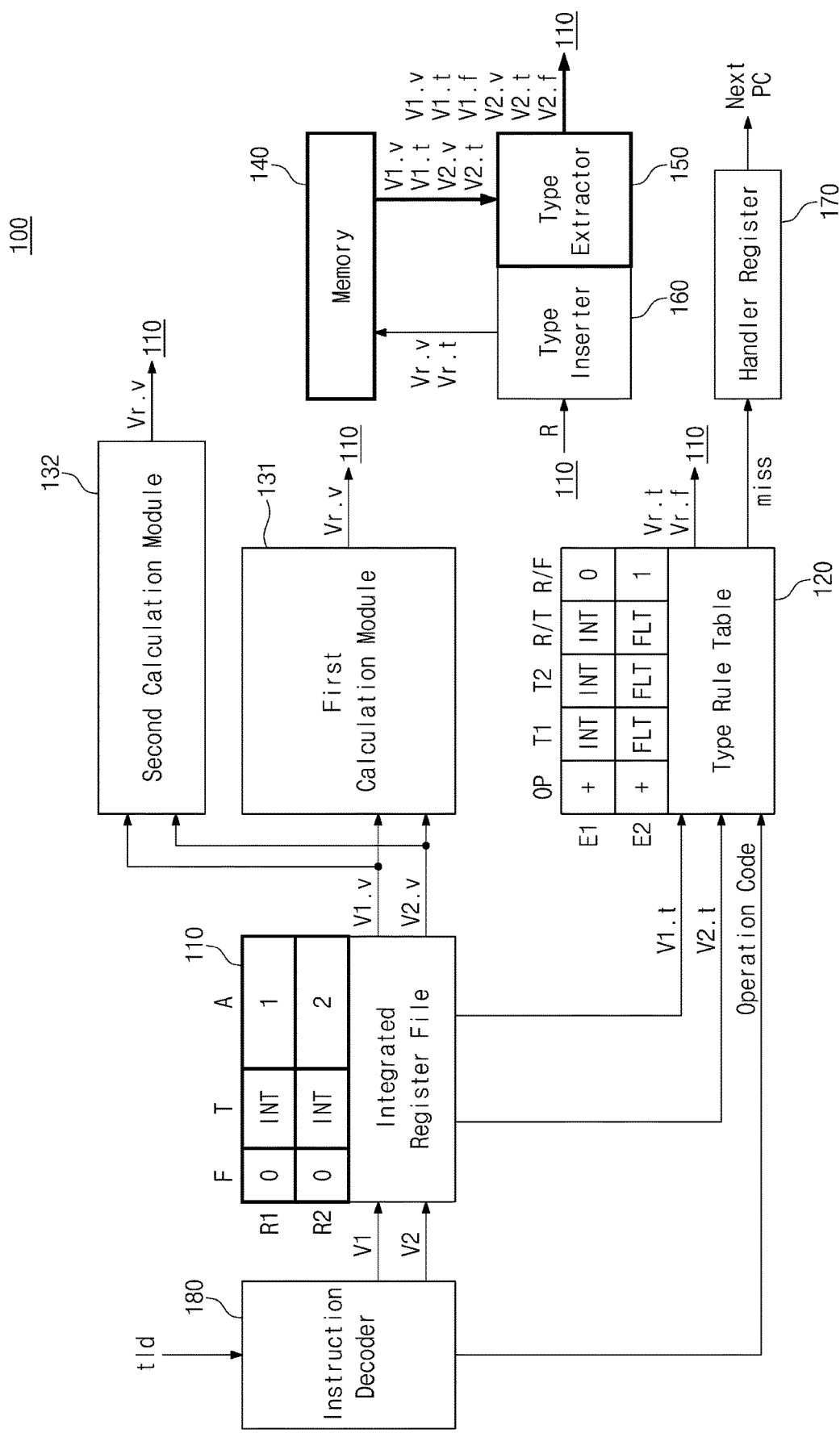
FIG. 5 is a drawing showing an operation of extracting, by the computing device of FIG. 3, a type of a variable.

FIG. 5 is a drawing showing an operation of extracting, by the computing device of FIG. 3, a type of a variable. In relation to FIG. 5, the instruction decoder 180 may receive "tld" and decode "tld". "tld" may be an instruction for instructing to extract types of a first variable V1 and a second variable V2. On the basis of a decoding result, the type extractor 150 may extract, from the memory 140, a value $V1.v$ of the first variable, a type $V1.t$ of the first variable, a value $V2.v$ of the second variable, and a type $V2.t$ of the second variable. The type extractor 150 may generate a flag bit $V1.f$ of the first variable and a flag bit $V2.f$ of the second variable from the type $V1.t$ of the first variable and the type $V2.t$ of the second variable. The type extractor 150 may store, in the integrated register file 110, the value of the first variable $V1.v$, the type $V1.t$ of the first variable, the flat bit $V1.f$ of the first variable, the value $V2.v$ of the second variable, the type $V2.t$ of the second variable, and the flag bit $V2.f$ of the second variable.

The value of and type information on the first variable V1 are stored in a first register R1, the value of and type information on the second variable V2 may be stored in a second register R2. When the value $V1.v$ of the first variable is '1' and the type $V1.t$ of the first variable is an integer type, '0', "INT", and '1' may be respectively stored in a flag field F, a type field T, and a value field A of the first register R1.

When the value V2.v of the second variable is '2' and the type V2.t of the second variable is an integer type, '0', "INT", and '2' may be respectively stored in a flag field F, a type field T, and a value field A of the second register R2.

Figure 6:
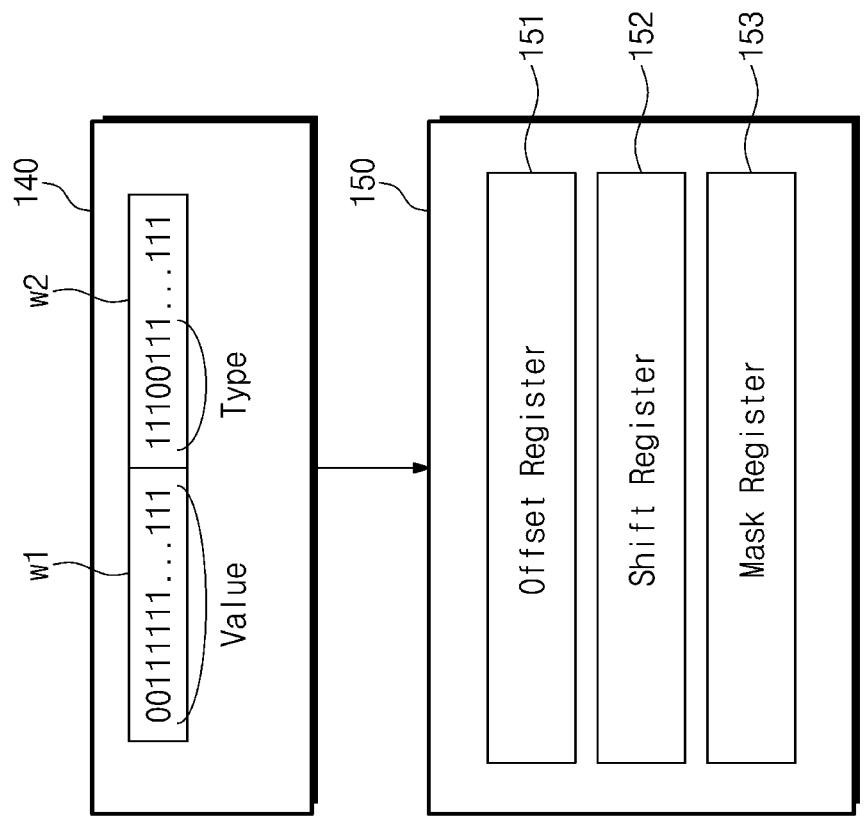
FIG. 6 is a block diagram for explaining an operation of a type extractor of FIG. 5 in detail.

FIG. 6 is a block diagram for explaining an operation of the type extractor of FIG. 5 in detail. In relation to FIG. 6, the memory 140 may include a first data word w1 and a second data word w2. The first data word w1 may include a value of a variable, and the second data word w2 may include a type of the variable.

The type extractor 150 may include an offset register 151, a shift register 152, and a mask register 153. The offset register 151 may store a position of a data word including the type of the variable on the basis of the data word including the value of the variable. As shown in FIG. 6, the second data word w2 including the type of the variable is located in rear on the basis of the first data word w1 including the value of the variable, and the offset register 151 may store information indicating the rear.

The shift register 152 may store a start position of bits indicating the type in the data word including the type of the variable. Since only a part of the bits included in the data word indicates the type, the shift register 152 may store the start position of the bits indicating the type. As shown in FIG. 6, when the bits indicating the type in the second data word w2 including the type of the variable are first to eighth bits (i.e., '11100111'), the shift register 152 may store the position of the first bit as the start position.

The mask register 153 may store bits of which values are '1' as many as the number of bits indicating the type. As shown in FIG. 6, the bits indicating the type are 8 bits, the mask register 153 may store the 8 bits of which the value is '1' (i.e., '11111111').

The type extractor 150 may determine the position of the second data word w2 from the information stored in the offset register 151. The type extractor 150 may determine the start position of bits indicating the type from the information stored in the shift register 152. The type extractor 150 may extract type bits from the second data word w2 on the basis of the start position of the bits indicating the type using the bits stored in the mask register 153.

The structure of the data word stored in the memory 140 may become different according to a language type of a script and a type of an engine for converting the script, and thus, information stored in the offset register 151, the shift register 152, and the mask register 153 may become different. The values of the offset register 151, the shift register 152, and the mask register 153 may be set on the basis of a separate instruction.

Figure 7:
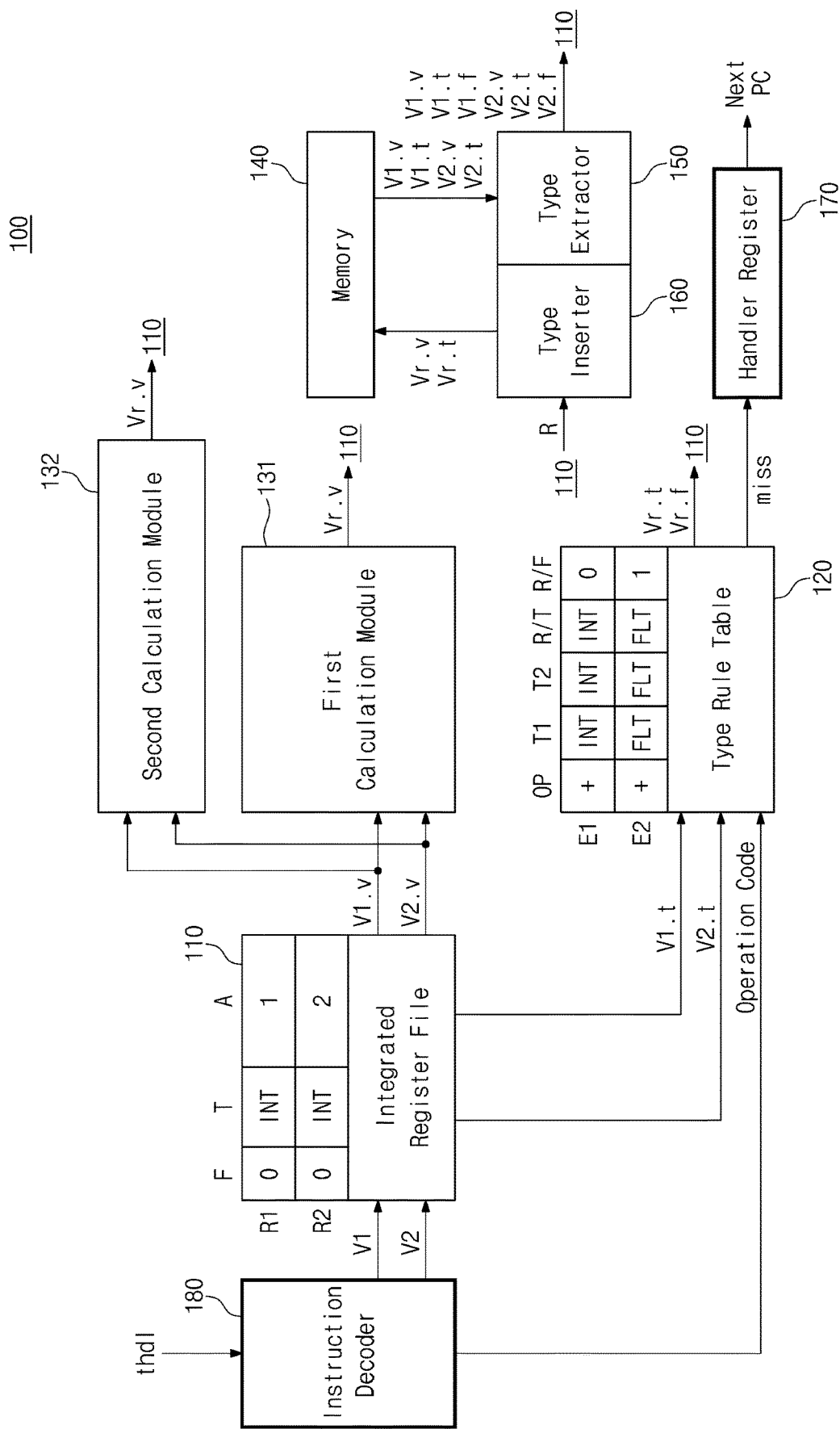
FIG. 7 is a drawing showing an operation of storing, by the computing device of FIG. 3, a start address of a type check routine.

FIG. 7 is a drawing showing an operation of storing the start address of the type check routine of the computing device of FIG. 3. In relation to FIG. 7, the instruction decoder 180 may receive "thdl" and decode "thdl". The start address of the type check routine may be stored in the handler register 170 on the basis of a decoding result. In response to a type check instruction, the computing device 100 may perform a type check in a typical manner without using the type rule table 120.

Figure 8:
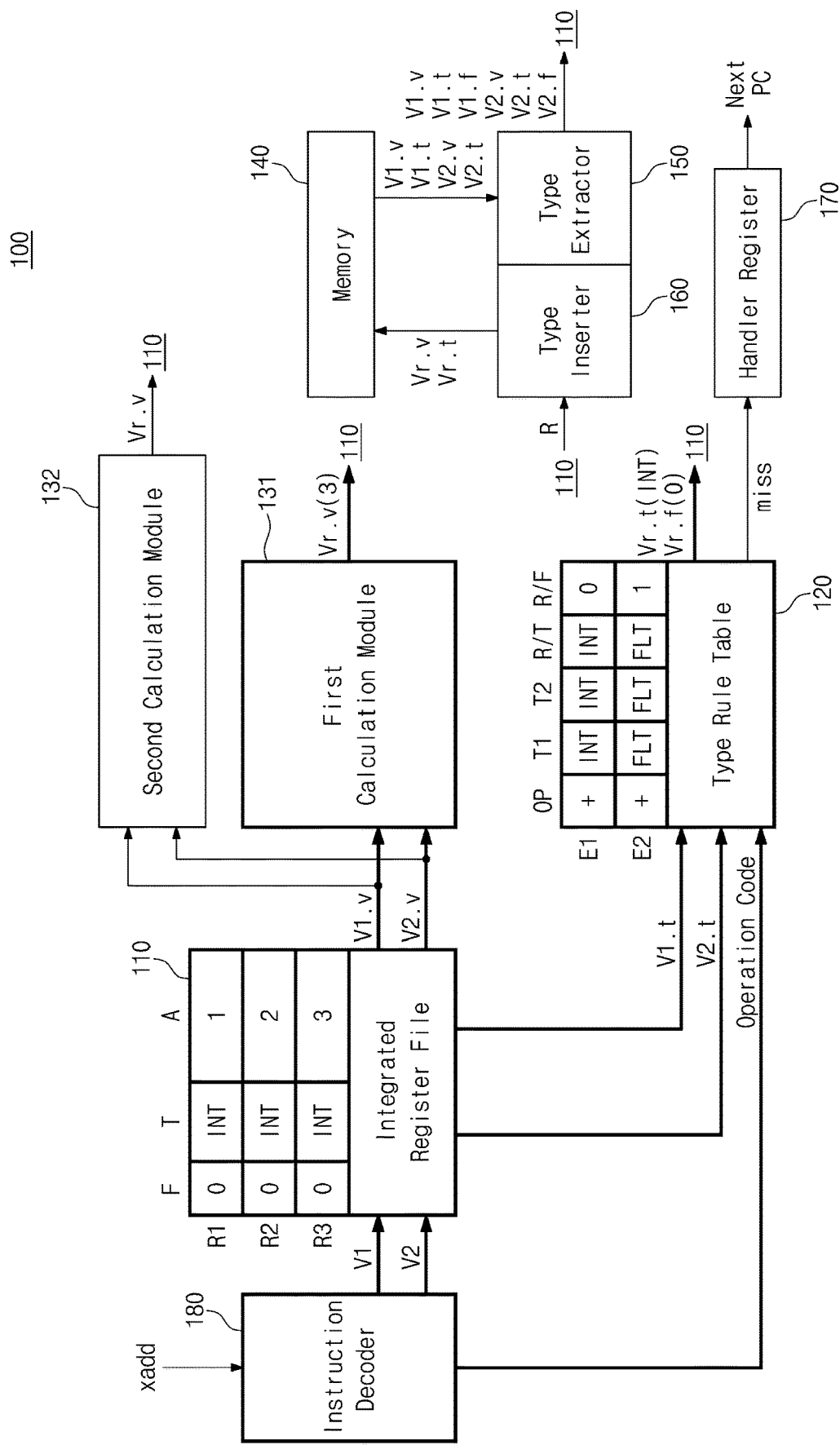
FIG. 8 is a drawing showing an operation of performing, by the computing device of FIG. 3, an addition of two integer type variables.

FIG. 8 is a drawing showing an operation of performing, by the computing device of FIG. 3, an addition of two integer type variables. In relation to FIG. 8, the instruction decoder 180 may receive "xadd" and decode "xadd". On the basis of a decoding result, the instruction decoder 180 may provide an operation code of the instruction to the type rule table 120, and provide the first variable V1 and the second variable V2 to the integrated register file 110.

The first register R1 of the integrated register file 110 may correspond to the first variable V1, and the second register R2 may correspond to the second variable V2. The integrated register file 110 may check that the flag bit stored in the first register R1 and the flag bit stored in the second register R2 are all '0' so as to determine that the first variable V1 and the second variable V2 are the integer types. Accordingly, the integrated register file 110 may provide the value V1.v of the first variable and the value V2.v of the second variable to the first calculation module 131. The value V1.v of the first variable may be '1', and the value V2.v of the second variable may be '2'.

The first calculation module 131 may perform an addition of the value V1.v of the first variable and the value V2.v of the second variable. Although not shown in FIG. 8, the first calculation module 131 may receive information about a calculation type (i.e., an addition) from the instruction decoder 180. For example, the first calculation module 131 may receive an operation code of an instruction from the instruction decoder 180, and perform an addition according to the operation code. The first calculation module 131 may generate '3' as a calculation result Vr.v. The generated calculation result Vr.v may be stored in a third register R3 of the integrated register file 110. In other words, the generated calculation result Vr.v may be stored in a value field A of the third register R3.

The integrated register file 110 may provide the type V1.t of the first variable extracted from the first register R1 to the type rule table 120, and may provide the type V2.t of the second variable extracted from the second register R2 to the type rule table 120. The type V1.t of the first variable and the type V2.t of the second variable may be "INT". In the type rule table 120, whether corresponding entry exists may be checked on the basis of an operation code "+" provided from the instruction decoder 180, and types "INT" and "INT" of the variables provided from the integrated register file 110. Since values of the operation code field OP, a first type field T1, and a second type field T2 stored in a first entry E1 are respectively identical to the provided operation code "+" and the types "INT" and "INT" of the variables, the type rule table 120 may output the values of a corresponding result type field R/T and a corresponding result flat field R/F. In other words, as the type Vr.t of the calculation result, "INT" may be output, and as the flag bit Vr.f of the calculation result, '0' may be output from the type rule table 120. The type Vr.t of the output calculation result and the flag bit Vr.f of the output calculation result may be stored in the third register R3 of the integrated register file 110. The type Vr.t of the calculation result may be stored in the type field T and the flag bit Vr.f of the calculation result may be stored in the flag field F.

Figure 9:
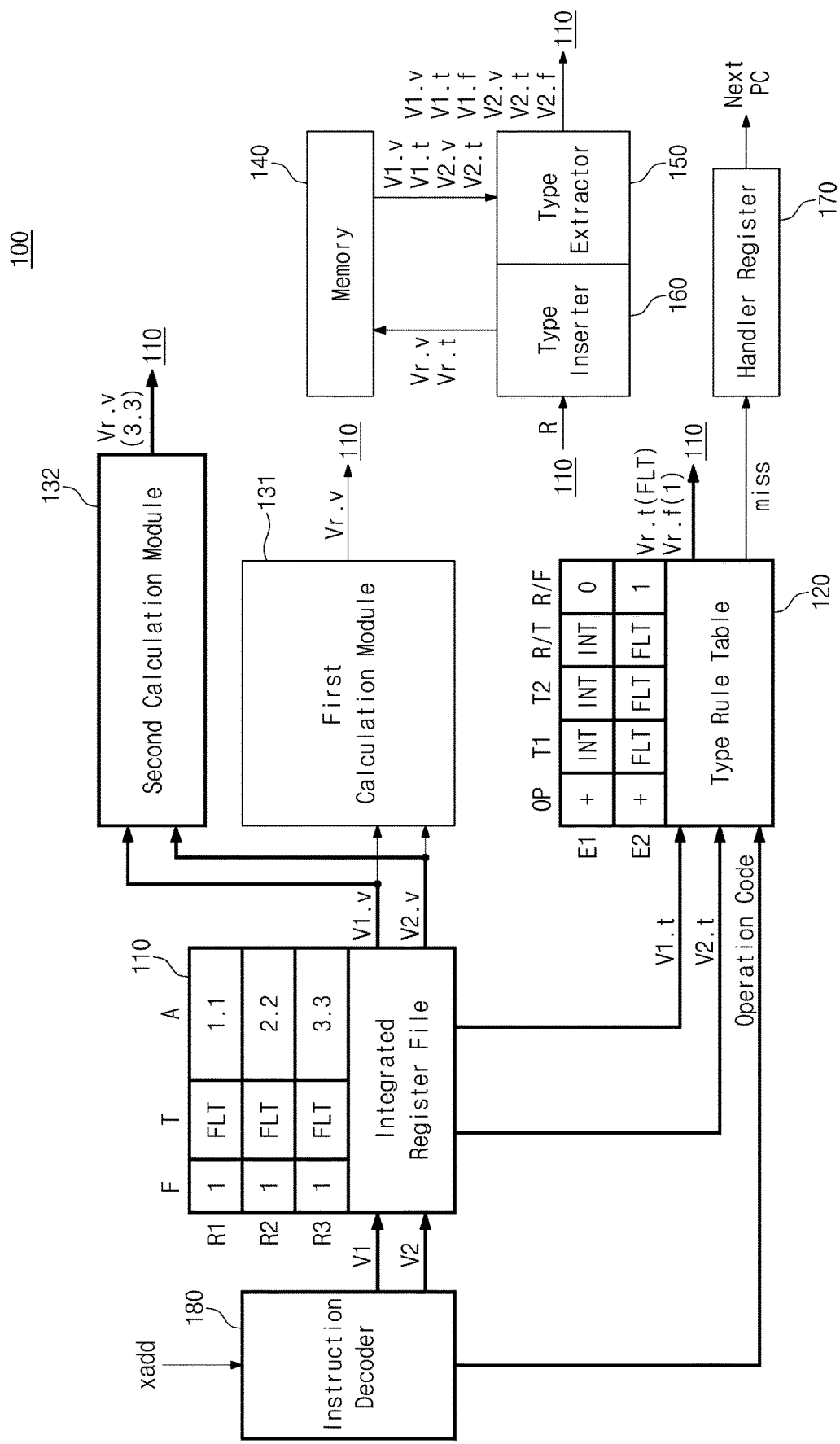
FIG. 9 is a drawing showing an operation of performing, by the computing device of FIG. 3, an addition of two floating point type variables.

FIG. 9 is a drawing showing an operation of performing, by the computing device of FIG. 3, an addition of two floating point type variables. In relation to FIG. 9, the instruction decoder 180 may receive "xadd" and decode "xadd". On the basis of a decoding result, the instruction decoder 180 may provide an operation code of the instruction to the type rule table 120, and provide the first variable V1 and the second variable V2 to the integrated register file 110.

The first register R1 of the integrated register file 110 may correspond to the first variable V1, and the second register R2 may correspond to the second variable V2. The integrated register file 110 may check that the flag bit stored in the first register R1 and the flag bit stored in the second register R2 are all '1' so as to determine that the first variable V1 and the second variable V2 are the floating point types.

Accordingly, the integrated register file 110 may provide the value V1.v of the first variable and the value V2.v of the second variable to the second calculation module 132. The value V1.v of the first variable may be '1.1', and the value V2.v of the second variable may be '2.2'.

The second calculation module 132 may perform an addition of the value V1.v of the first variable and the value V2.v of the second variable. Although not shown in FIG. 9, the second calculation module 132 may receive information about a calculation type (i.e., an addition) from the instruction decoder 180. For example the second calculation module 132 may receive an operation code of "xadd" from the instruction decoder 180, and perform an addition according to the operation code. The second calculation module 132 may generate '3.3' as a calculation result Vr.v. The generated calculation result Vr.v may be stored in the third register R3 of the integrated register file 110. In other words, the generated calculation result Vr.v may be stored in the value field A of the third register R3.

The integrated register file 110 may provide the type V1.t of the first variable extracted from the first register R1 to the type rule table 120, and may provide the type V2.t of the second variable extracted from the second register R2 to the type rule table 120. The type V1.t of the first variable and the type V2.t of the second variable may be "FLT". In the type rule table 120, whether corresponding entry exists may be checked on the basis of an operation code "+" provided from the instruction decoder 180 and types "FLT" and "FLT" of the variables provided from the integrated register file 110. Since values of the operation code field OP, the first type field T1, and the second type field T2 stored in a second entry E2 are respectively identical to the provided operation code "+" and the types "FLT" and "FLT" of the variables, the values of a corresponding result type field R/T and a corresponding result flag field R/F may be output from the type rule table 120. In other words, as the type Vr.t of the calculation result, "FLT" may be output, and as the flag bit Vr.f of the calculation result, '1' may be output from the type rule table 120. The type Vr.t of the output calculation result and the flag bit Vr.f of the calculation result may be stored in the third register R3 of the integrated register file 110. The type Vr.t of the calculation result may be stored in the type field T and the flag bit Vr.f of the calculation result may be stored in the flag field F.

Figure 10:
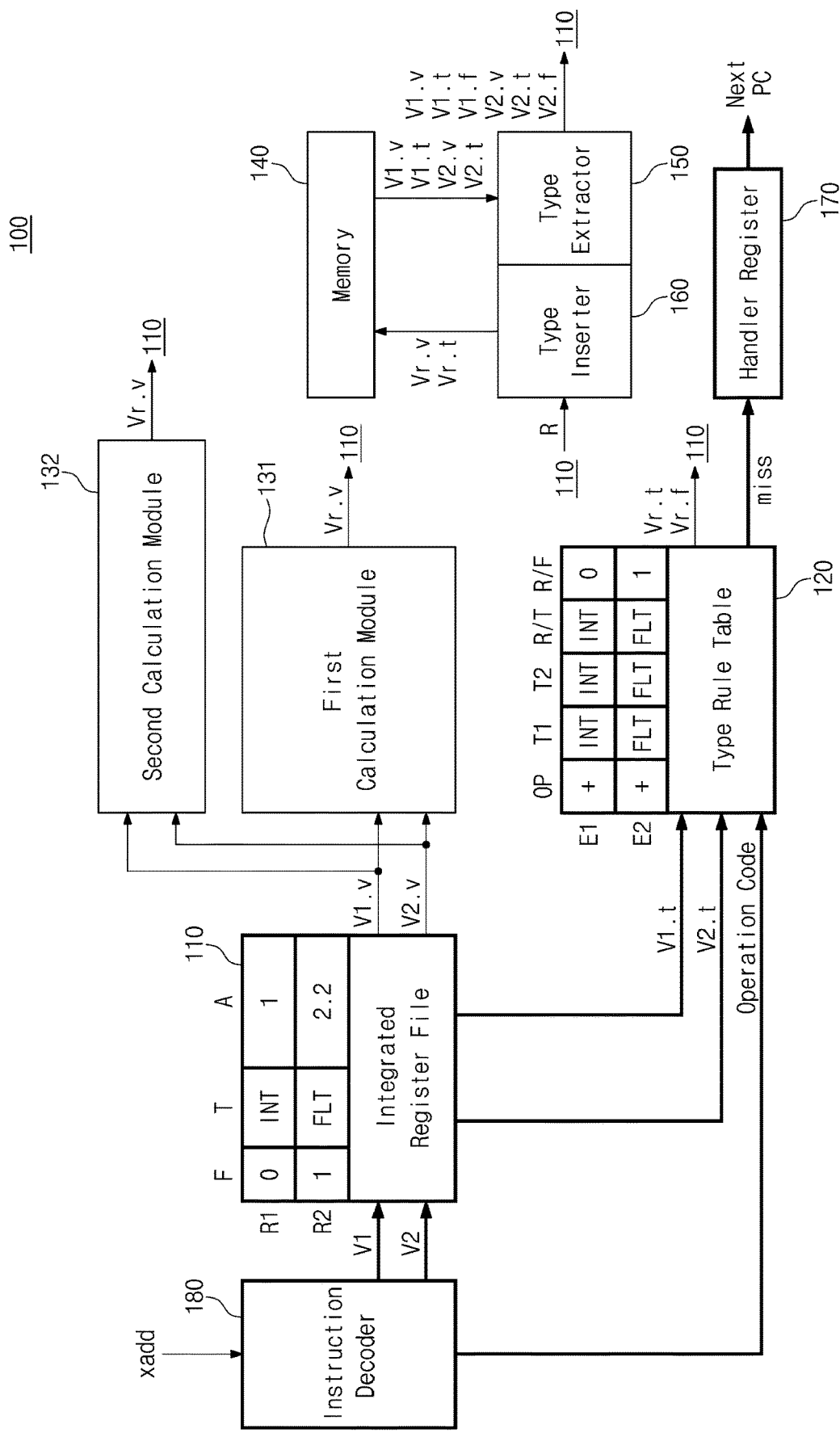
FIG. 10 is a drawing showing an operation in which the computing device of FIG. 3 moves to a start address of the type check routine.

FIG. 10 is a drawing showing an operation that the computing device of FIG. 3 moves to the start address of the type check routine. In relation to FIG. 10, the instruction decoder 180 may receive "xadd" and decode "xadd". On the basis of a decoding result, the instruction decoder 180 may provide an operation code of the instruction to the type rule table 120, and provide the first variable V1 and the second variable V2 to the integrated register file 110.

The first register R1 of the integrated register file 110 may correspond to the first variable V1, and the second register R2 may correspond to the second variable V2. The integrated register file 110 may check that the flag bit stored in the first register R1 is '0' and the flag bit stored in the second register R2 is '1' so as to determine that data types of the first variable V1 and the second variable V2 are different. Accordingly, the integrated register file 110 may not provide the value of the first variable V1.v and the value V2.v of the second variable to the first calculation module 131 or the second calculation module 132.

The integrated register file 110 may provide the type V1.t of the first variable extracted from the first register R1 to the type rule table 120, and may provide the type V2.t of the second variable extracted from the second register R2 to the type rule table 120. The type V1.t of the first variable may be "INT" and the type V2.t of the second variable may be "FLT". In the type rule table 120, whether corresponding entry exists may be checked on the basis of an operation code "+" provided from the instruction decoder 180 and types "INT" and "FLT" of the variables provided from the integrated register file 110. Like the first entry E1 and the second entry E2, the type rule table 120 may not include an entry in which the types of the variables are different (i.e., "INT" or "FLT"). Since values of a corresponding result type field R/T and a corresponding result flag field R/F do not exist, the type Vr.t and the flag bit Vr.f of a calculation result may not be output from the type rule table 120. The type rule table 120 may provide, to the handler register 170, a signal 'miss' indicating that a corresponding entry does not exist. The handler register 170 may output a stored address in response to the signal 'miss'. The computing device 100 may perform the type check routine indicated by the output address. The computing device 100 may check the type V1.t of the first variable and the type V2.t of the second variable through a typical type check manner.

When it is checked that the type V1.t of the first variable is an integer type and the type (V2.t) of the second variable is a floating point type according to the type check, the computing device 100 may convert the type V1.t of the first variable to the floating point type. Then, the computing device 100 may perform an addition of the first variable V1 and the second variable V2 through the second calculation module 132.

Figure 11:
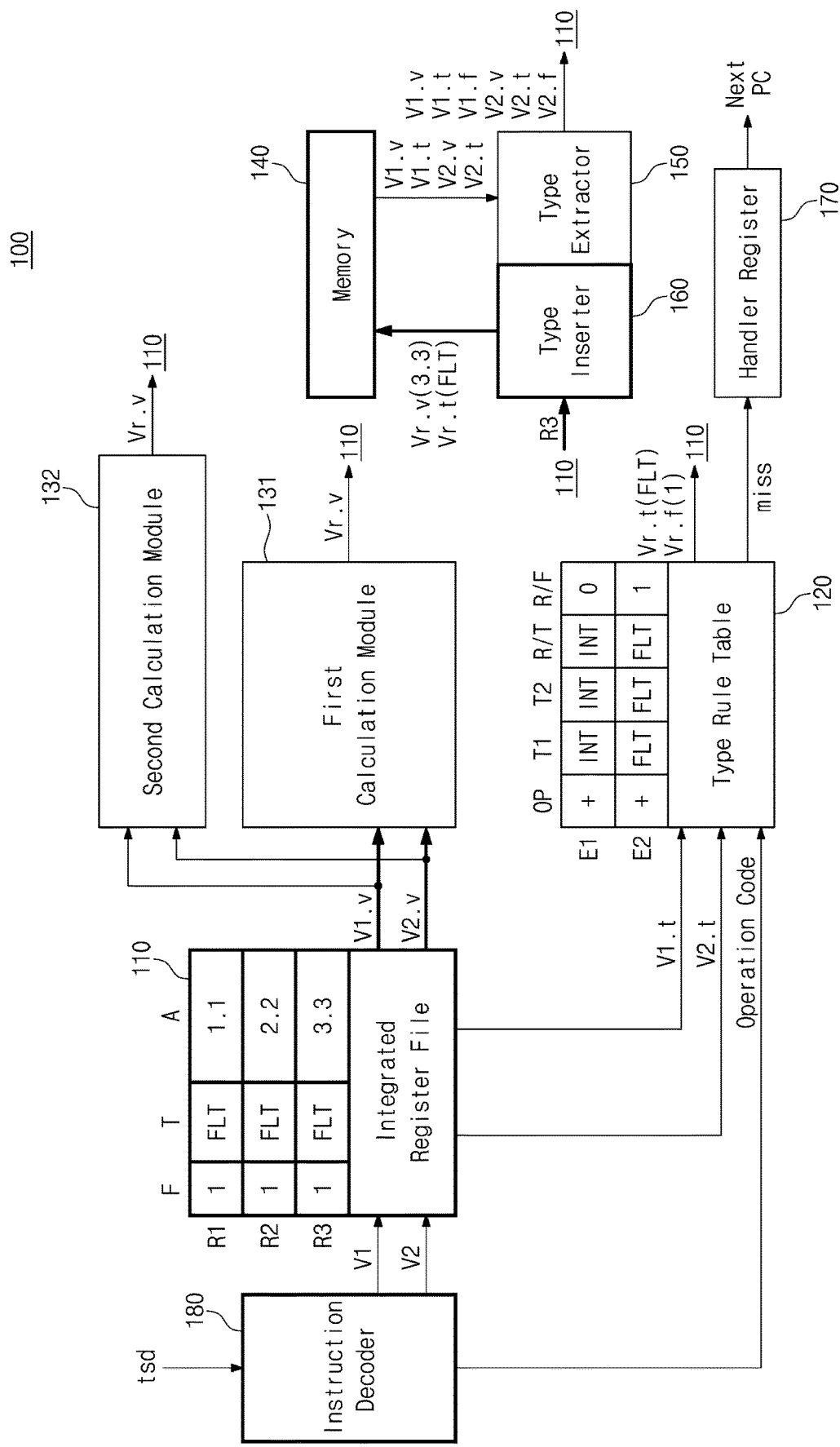
FIG. 11 is a drawing showing an operation of storing, by the computing device of FIG. 3, the type of the variable in a memory.

FIG. 11 is a drawing showing an operation of storing, by the computing device of FIG. 3, the type of the variable in the memory. In relation to FIG. 11, the instruction decoder 180 may receive "tsd" and decode "tsd". On the basis of a decoding result, the type inserter 160 may receive values of the third register R3 from the integrated register file 110. The type inserter 160 may extract the value Vr.v of the calculation result and the type Vr.t of the calculation result from the values of the third register R3. For example, like the type extractor 150 of FIG. 6, the type inserter 160 may include a shift register (not shown) and a mask register (not shown). The type inserter 160 may extract the value Vr.v of the calculation result and the type Vr.t of the calculation result from the values of the third register R3 using the shift register and the mask register. The type inserter 160 may extract '3.3' as the value Vr.v of the calculation result, and "FLT" as the type Vr.t of the calculation result. The type extractor 160 may store the extracted calculation result and type of the calculation result in the memory 140.

As described above, the computing device 100 according to an exemplary embodiment of the inventive concept may simply perform not only a type check of an operand, but also a type check of a calculation result using the integrated register file 110 and the type rule table 120. In addition, since a calculation and a type check for a calculation result may be performed together on the basis of one instruction (e.g., "xadd"), the number of the generated instructions may be reduced. According to the reduction in the number of instructions, the number of branch instructions may be reduced, and accordingly, a branch prediction ratio may be improved. In addition, according to the reduction in the number of instructions, performance of a cache memory, which stores instructions, may be improved.

Figure 12:
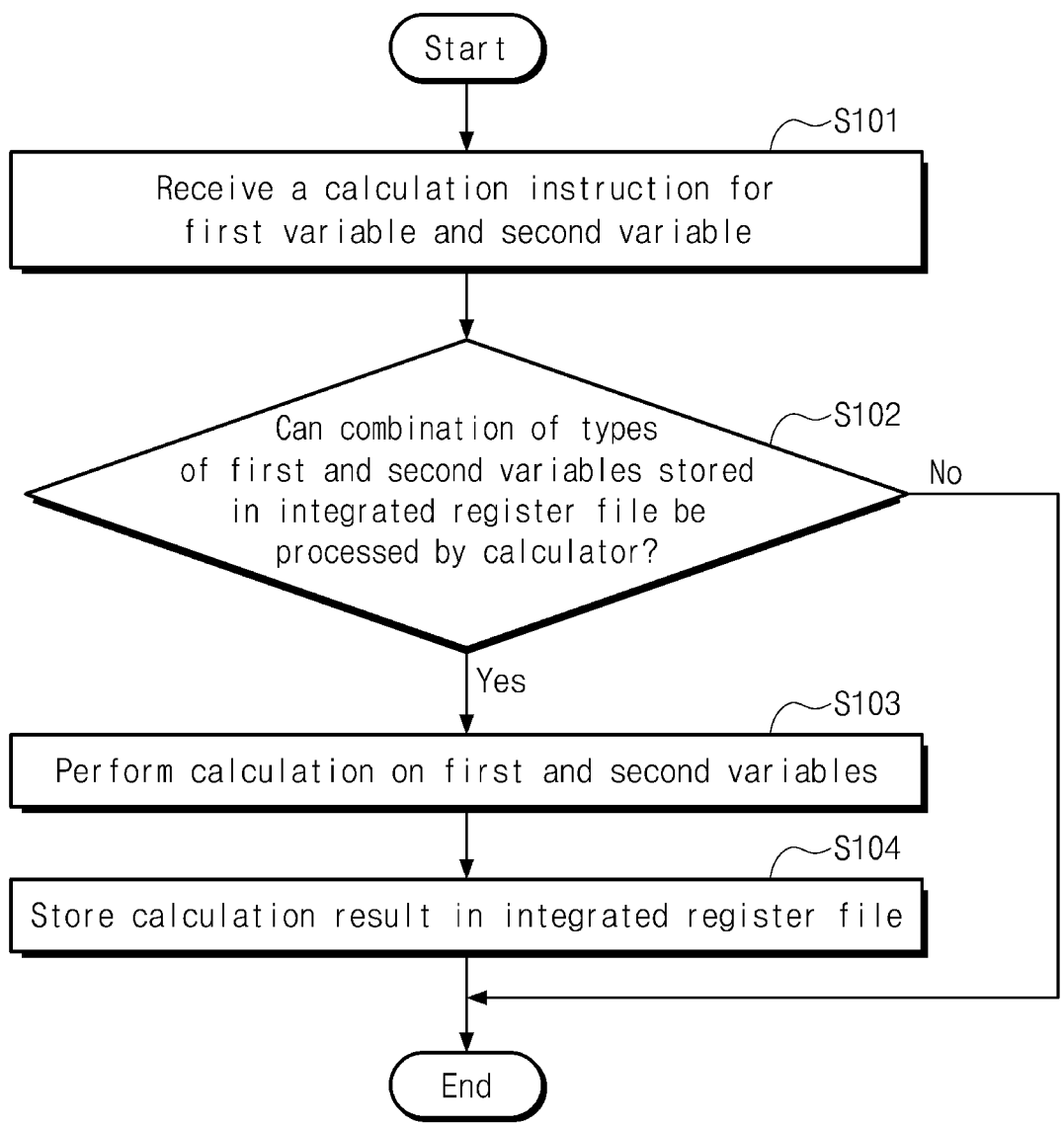
FIG. 12 is a flowchart showing an exemplary operation of the computing device of FIG. 1.

FIG. 12 is a flowchart showing an exemplary operation of the computing device of FIG. 1. In relation to FIGS. 1 and 12, in operation S101, the computing device 100 may receive a calculation instruction for first and second variables. In operation S102, the computing device 100 may determine whether a combination of types of the first and second variables stored in the integrated register file 110 may be processed by the calculator 130. For example, the computing device 100 may determine the combination of the types of the first and second variables on the basis of values of the flag field F of the integrated register file 110.

When the combination of the types of the first and second variables may be processed by the calculator 130, the computing device 100 may perform, in operation S103, a calculation for the first and second variables. For example, when the types of the variables are all integer types or floating point types, the computing device 100 may perform the calculation. In operation S104, the computing device may store a calculation result in the integrated register file 110.

Figure 13:
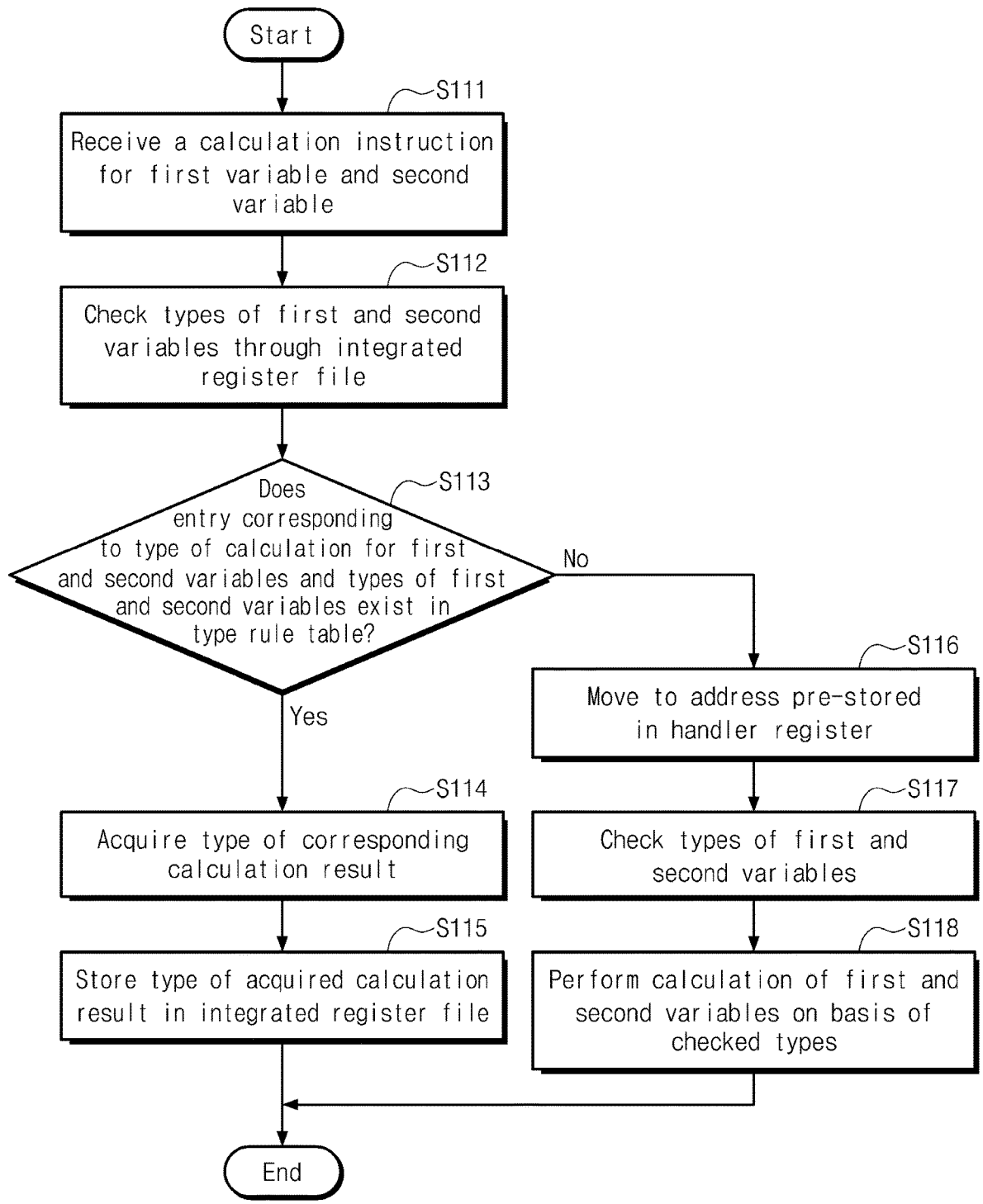
FIG. 13 is a flowchart showing another exemplary operation of the computing device of FIG. 1.

FIG. 13 is a flowchart showing another exemplary operation of the computing device of FIG. 1. In relation to FIGS. 1 and 13, in operation S111, the computing device 100 may receive a calculation instruction for the first and second variables. In operation S112, the computing device 100 may check the types of the first and second variables from the integrated register file 110. In operation S113, the computing device 100 may determine whether there is, in the type rule table 120, entry corresponding to calculation types of the first and second variables and the types of the first and second variables. For example, the calculation types of the first and second variables may be an operation code of an instruction.

When there is the corresponding entry, in operation S114, the computing device 100 may acquire a corresponding type of a calculation result. In operation S115, the computing device 100 may store the type of the calculation result in the integrated register file 110. For example, in operation S114, the computing device 100 may acquire not only the corresponding type of the calculation result, but further acquire a corresponding flag bit of the calculation result. In this case, in operation S115, the computing device 100 may store the acquired type of the calculation result and the flag bit of the calculation result in the integrated register file 110.

When there is not the corresponding entry, in operation S116, the computing device 100 may move to an address pre-stored in the handler register 170. The computing device 100 may move to the pre-stored address to perform an operation according to a type check routine. The type check according to the type check routine may be performed in a typical manner in which the type rule table 120 is not used. In operation S117, the computing device 100 may check the types of the first and second variables according to the type check routine. In operation S118, the computing device 100 may perform a calculation of the first and second variables on the basis of the checked types. For example, the computing device 100 may convert one type between the first and second variables to another variable type to make the types of first and second variables equal, and then perform the calculation of the first and second variables.

FIG. 14 is an example of a bytecode interpreter according to an exemplary embodiment. In relation to FIG. 14, a code in the FIG. 14 shows an example in which the instructions in FIG. 4 for processing "ADD" in FIG. 4 are applied. In lines 5 and 6 of the code, a type and value of each variable may be stored in registers tmp1 and tmp2 of the integrated register file 110 according to an instruction "tld". In line 7, a start address of the type check routine may be stored in the handler register 170 according to an instruction "thdl".

In line 8, a type check for variables stored in the registers tmp1 and tmp2 may be performed according to an instruction "xadd". In addition, on the basis of an operation code and the types of the variables, it may be determined whether there is a corresponding entry in the type rule table 120. When the corresponding entry exists, a calculation result according to an addition and a type of the calculation result output from the type rule table 120 may be stored in the register tmp1. Then, in line 9, the calculation result and the type of the calculation result stored in the register tmp1 may be stored in the memory 140 according to an instruction "tsd".

When the corresponding entry does not exist, the computing device 100 may move to an address (i.e., ADD_slow in line 15) stored in the handler register 170 to perform a type check and calculation according to a typical manner. Then, the computing device may store the type and calculation result in the memory 140.

As described above, the computing device 100 according to an exemplary embodiment may include the integrated register file 110 and the type rule table 120. The computing device 100 may operate based on a new instruction that may be processed on the basis of the integrated register file 110 and the type rule table 120. Although some instructions are described in relation to FIGS. 3 to 14, the inventive concept is not limited thereto, and instructions according to an exemplary embodiment may include various instructions that may be processed on the basis of the integrated register file 110 and the type rule table 120. For example, the instructions according to an exemplary embodiment may include instructions in Table 1.

TABLE 1

| instruction | operation |
| --- | --- |
| tld | extract a value and type of a variable from a memory to store in an integrated register file |
| tsd | extract a value and type of a variable from an integrated register file to store in a memory |
| xadd | perform an addition and a type check of an addition result |
| xsub | perform a subtraction and a type check of a subtraction result |
| xmul | perform a multiplication and a type check of a multiplication result |
| setoffset | set a value of an offset register |
| setmask | set a value of a mask register |
| setshift | set a value of a shift register |
| set_trt | set an entry of a type rule table |
| flush_trt | delete an entry from a type rule table |
| thdl | store a start address of a type check routine in a handler register |
| tchk | perform only a type check using a type rule table |

Instruction "tchk" among instructions in Table 1 may be an instruction for performing a type check for a variable using the type rule table 120. According to the instruction "tchk", the type rule table 120 may determine whether there is an entry corresponding to the operation code and the type of the variable provided from the integrated register file 110. When the corresponding entry exists, the type rule table 120 may output type information on corresponding result data. In this case, the computing device 100 may determine that the type check for the corresponding variable has been performed (i.e., hit), and then perform a next instruction. When the corresponding entry does not exist, the type rule table 120 may provide a signal 'miss' for indicating that the corresponding entry does not exist. Accordingly, the computing device 100 may move to the start address of the type check routine to check the type of the variable without using the type rule table 120.

As shown table 1, various instructions may be performed based on the computing device 100, and the inventive concept is not limited to the instructions in Table 1.

According an exemplary embodiment, a computing device capable of simply performing a type check of a variable through a new instruction, and an operating method thereof may be provided.

According to an exemplary embodiment, the number of dynamic instructions necessary for a type check of a variable may be reduced through a new instruction.

According to an exemplary embodiment, since a type check of a variable and a calculation are performed substantially at the same time, a branch prediction ratio may be improved according to reduction in branch instruction.

The above-described is detailed embodiments for practicing the present inventive concept. The present disclosure includes not only the above-described embodiments but also simply changed or easily modified embodiments. In addition, the present inventive concept also include techniques easily modified and practiced using the embodiments of the present disclosure. Therefore, the scope of the present disclosure is not limited to the described embodiments but is defined by the claims and their equivalents.

What is claimed is:

1. A computing device comprising:
at least one processor configured to,
store a first variable type and a first variable value of a first variable, and a second variable type and a second variable value of a second variable in an integrated register file included in the at least one processor,
store a first type flag and a second type flag in the integrated register file, the first type flag for indicating whether the first variable type is an integer type or a floating point type, and the second type flag for indicating whether the second variable type is the integer type or the floating point type,
perform a first calculation on the first and second variables according to the first and second variable types in response to both the first type flag and the second type flag indicating a first same type, to output a first calculation result of the first same type,
perform the first calculation to output the first calculation result of a second same type by converting one of the first and second variables to have the second same type as the other of the first and second variables in response to the first type flag and the second type flag indicating different types from each other, and
output a type of the first calculation result to the integrated register file in response to a type rule table included in the at least one processor including an entry, from among a plurality of entries, corresponding to the type of the first calculation result and the first and second variable types.

2. The computing device of claim 1, wherein the at least one processor is further configured to output a type flag of the first calculation result for indicating whether the type of the first calculation result is the integer type or the floating point type, from the type rule table.

3. The computing device of claim 1, wherein the at least one processor is further configured to store the first calculation result and the type of the first calculation result in the integrated register file.

4. The computing device of claim 3, wherein the at least one processor is further configured to extract the first and second variable types and the first and second variable values from a memory to store in the integrated register file.

5. The computing device of claim 4, wherein the at least one processor is further configured to,
store, on a basis of a first data word comprising a value of a variable, a position of a second data word comprising a type of the variable,
store a start position of bits to indicate the type of the variable in the second data word, which includes the type of the variable, and
store bits of which values are 1 as many as a number of the bits indicating the type of the variable.

6. The computing device of claim 4, wherein the at least one processor is further configured to extract the first calculation result and the type of the first calculation result from the integrated register file to store in the memory.

7. The computing device of claim 1, wherein the at least one processor is further configured to,
store a start address of a routine for performing a type check of a variable without using the type rule table, and
check the first and second variable types according to execution of the routine, in response to the type rule table not including a corresponding entry.

8. An operating method of a computing device, which comprises at least one processor including an integrated register file configured to store types and values of variables and a type rule table including a plurality of entries, the operation method comprising:
receiving, by the at least one processor, an instruction for a first calculation on a first variable and a second variable;
storing, by the at least one processor, a first type flag and a second type flag in the integrated register file, the first type flag for indicating whether a first variable type of the first variable is an integer type or a floating point type, and the second type flag for indicating whether a second variable type of the second variable is the integer type or the floating point type;
checking, by the at least one processor, the first variable type of the first variable and the second variable type of the second variable from the integrated register file;
performing, by the at least one processor, a first calculation on the first and second variables according to the first and second variable types in response to both the first type flag and the second type flag indicating a first same type to output a first calculation result of the first same type;
performing, by the at least one processor, the first calculation to output the first calculation result of a second same type by converting one of the first and second variables to have the second same type as the other of the first and second variables in response to the first type flag and the second type flag indicating different types from each other; and
acquiring a type of the first calculation result from the type rule table in response to the plurality of entries included in the type rule table including an entry corresponding to the type of the first calculation result and the first and second variable types.

9. The operating method of claim 8, further comprising:
storing, by the at least one processor, the type of the first calculation result in the integrated register file.

10. The operating method of claim 8, further comprising:
performing, by the at least one processor, the first calculation on the first and second variables according to the first and second variable types stored in the integrated register file.

11. The operating method of claim 10, further comprising:
storing, by the at least one processor, the first calculation result generated from the first calculation in the integrated register file.

12. The operating method of claim 8, further comprising:
moving, by the at least one processor, to a start address of a type check routine for performing a type check of a variable, in response to the type rule table not including a corresponding entry;
checking, by the at least one processor, the first and second variable types without using the type rule table in response to the type check routine; and
converting, by the at least one processor, one of the first variable type or the second variable type so that, the first variable type matches the second variable type based on a result of the checking indicating that the first variable type and the second variable type are different from each other.

* * * * *